(12) United States Patent
Rini

(10) Patent No.: US 7,976,110 B2
(45) Date of Patent: Jul. 12, 2011

(54) HYBRID BRAKING SYSTEM

(76) Inventor: Guy Thomas Rini, Winchester, VA (US)

( * ) Notice: Subject to any disclaimer, the term of this patent is extended or adjusted under 35 U.S.C. 154(b) by 0 days.

(21) Appl. No.: 12/700,777

(22) Filed: Feb. 5, 2010

(65) Prior Publication Data
US 2010/0219681 A1 Sep. 2, 2010

Related U.S. Application Data

(60) Provisional application No. 61/202,444, filed on Feb. 27, 2009.

(51) Int. Cl.
*B60K 1/00* (2006.01)
(52) U.S. Cl. .............. 303/152; 180/65.27; 180/65.285
(58) Field of Classification Search ............... 303/10, 303/11, 152; 180/65.21, 65.26, 65.285, 65.51, 180/165, 65.27; 701/22, 504
See application file for complete search history.

(56) References Cited

U.S. PATENT DOCUMENTS

| | | | | |
|---|---|---|---|---|
| 5,898,282 | A * | 4/1999 | Drozdz et al. ............... | 318/139 |
| 7,441,845 | B2 | 10/2008 | Crombez et al. | |
| 7,552,705 | B2 | 6/2009 | Serkh et al. | |
| 2003/0019675 | A1* | 1/2003 | Haas et al. .................. | 180/65.6 |
| 2006/0021809 | A1* | 2/2006 | Xu et al. ..................... | 180/65.2 |
| 2007/0107958 | A1* | 5/2007 | Oliver ........................ | 180/65.4 |
| 2007/0278027 | A1* | 12/2007 | Gray et al. .................. | 180/165 |
| 2007/0284165 | A1* | 12/2007 | Patterson ..................... | 180/65.3 |
| 2008/0022686 | A1* | 1/2008 | Amdall et al. ................ | 60/716 |
| 2008/0308328 | A1* | 12/2008 | Kejha ......................... | 180/65.2 |
| 2009/0139788 | A1* | 6/2009 | Miller ......................... | 180/165 |
| 2009/0188733 | A1* | 7/2009 | Mack ........................ | 180/65.285 |
| 2010/0059300 | A1* | 3/2010 | Brown ....................... | 180/65.285 |
| 2010/0125398 | A1* | 5/2010 | Headlee et al. ................ | 701/71 |
| 2010/0151989 | A1* | 6/2010 | Read ............................ | 477/4 |

OTHER PUBLICATIONS

"The Air Brake Handbook", Bendix Commercial Vehicle Systems LLC, 2004, 66 pages.
http://www.flickr.com/photos/mbarkley/sets/72157604901740784, E-Trailer (I.C.E.) Pusher, Jan. 2000-Aug. 2008, 2 pages.
http://www.alternative-energy-news.info/remote-hybrid-helper, "Remote Hybrid Helper for Semi Trucks", Apr. 2008, 4 pages.

* cited by examiner

*Primary Examiner* — Christopher P Schwartz
(74) *Attorney, Agent, or Firm* — Sanford J. Piltch, Esq

(57) ABSTRACT

A hybrid braking system that operates in conjunction with a foundation braking system, whether an air, hydraulic, electric, mechanical or electric braking system. Recovered energy is returned to the axle wheels in a controlled manner while the vehicle is in motion and certain criteria are met so as to compensate for aerodynamic drag and rolling resistance for instance but not at a rate to accelerate or launch a vehicle.

14 Claims, 3 Drawing Sheets

HBS Controller Flow Chart—Top Level Logic

Vehicle Data Set:

Vehicle VIN

Vehicle type (flatbed, Van, bulk, 6x4 tractor, etc)

Vehicle curb weight

Tire rolling radius

Rolling Resistance/axle (empty)

Coefficient of Drag (CD)

Brake Gain (psi vs torque)

CD map =f(mph)

HYBRID BRAKING SYSTEM

BACKGROUND

The present invention relates to a hybrid braking system for use in wheeled vehicles, such as tractor and trailers with conventional air brake, for example.

Commercial heavy duty vehicles utilize foundation brake mechanisms that are typically an S-cam design utilizing a brake drum and shoes or an air disc brake utilizing a rotor and brake pads. The foundation brake creates friction which converts the kinetic energy to heat energy thus decelerating and/or bringing the vehicle or combination vehicles to a stop. The braking systems used to activate the foundation brake mechanisms are designed to conform to one or more safety standards. Most significant is Federal Motor Vehicle Safety Standard FMVSS 121 which is the standard for Air Brake Systems—Trucks, Buses, and Trailers. This standard specifies performance, equipment and dynamometer test requirements for braking systems on vehicles equipped with air and air-over-hydraulic brake systems, to ensure safe performance under normal and emergency conditions.

The braking process is repeated each time the vehicle is brought to a stop. Effectively, all available kinetic energy produced originally from the prime mover source (most commonly a diesel or gasoline engine) is dissipated as heat and wear of friction materials.

More recently, hybrid drive systems (commonly referred to as hybrids, hybrid drives, hybrid propulsion, etc.) have been introduced. These hybrid drive systems consist of electric machines (motor, generator or combination of both) or hydraulic machines (motor, pump or combination of both) to recover energy during braking and return it to the wheels during launch or propulsion.

While this technology has demonstrated improvements in fuel economy, it is limited to drive axles because the recovered energy is only used for launch and/or propulsion. The energy from non-drive axles, including steerable axles and all axles of towed vehicles, is lost to the foundation brakes on those respective axles. The potential of regenerative energy from these axles is not utilized by hybrid drive systems.

Further, there is little or no brake blending (e.g., proportionally braking with both the foundation brakes and the hybrid drive system) with an air brake system. This is because the hybrid drive systems are added on or retrofitted to an existing vehicle model. The system integrator does not want to de-tune or otherwise modify the air brake system that was designed to meet certain safety standards. The hybrid braking effort is always in addition to the foundation braking effort. Hence much of the available energy is lost to the foundation brakes and not recovered by the hybrid drive system. In some applications, the hybrid brake system is activated when the driver removes his/her foot from the throttle and before applying the brake. This is done in an effort to capture regenerative energy before the foundation brake is applied. The function is similar to engine or driveline retarders whereby the vehicle begins to slow down as soon as the throttle is released. Essentially there is no coasting. A typical application would be for refuse vehicles in residential service which do rapid start stop cycles. While this allows a greater portion of regenerative braking energy to go to the hybrid drive system it results in braking without the brake lights being on.

Another shortcoming of many hybrid drive systems is the need for a secondary cooling system in addition to the engine cooling system. The secondary cooling system is necessitated by the fact that the hybrid motor drive does double duty by operating at relatively high energy and power levels during the braking event and then again during the next launch and propulsion cycle. This generates appreciable heat in both modes and requires an external cooling system. The primary cooling system for the engine is typically incapable of handling this additional heat. That is, these systems operate in the temperature range of 90 to 105 degree C. which is well above the optimal 60 to 85 degree temperature range for hybrid drive systems. The secondary cooling system results in added system complexity, weight size and cost.

It would be desirable to provide a hybrid braking system which could maximize energy recovery, result in additional fuel savings and/or avoid the need for an additional cooling system.

SUMMARY

A wheeled vehicle having at least one non-drive axle and a braking system comprises a foundation brake mechanism operably connected to wheels on a non-drive axle; a hybrid brake mechanism including an energy recovery machine selectively actuable for connection to the non-drive axle in a braking mode for being driven by the non-drive axle to generate energy, and in a drive mode for transferring energy to the non-drive axle; an energy storage device for storing energy received from the energy recovery machine when the energy recovery machine is being operated in its braking mode, and for returning stored energy to the energy recovery machine to operate the energy recovery machine in its drive mode; and a controller operably connected to the hybrid brake mechanism for actuating the energy recovery machine selectively in its braking mode to receive energy from the non-drive axle, and in its drive mode for transferring energy to the non-drive axle only when the vehicle is in motion.

DETAILED DESCRIPTION OF PREFERRED EMBODIMENTS

Figure 1:
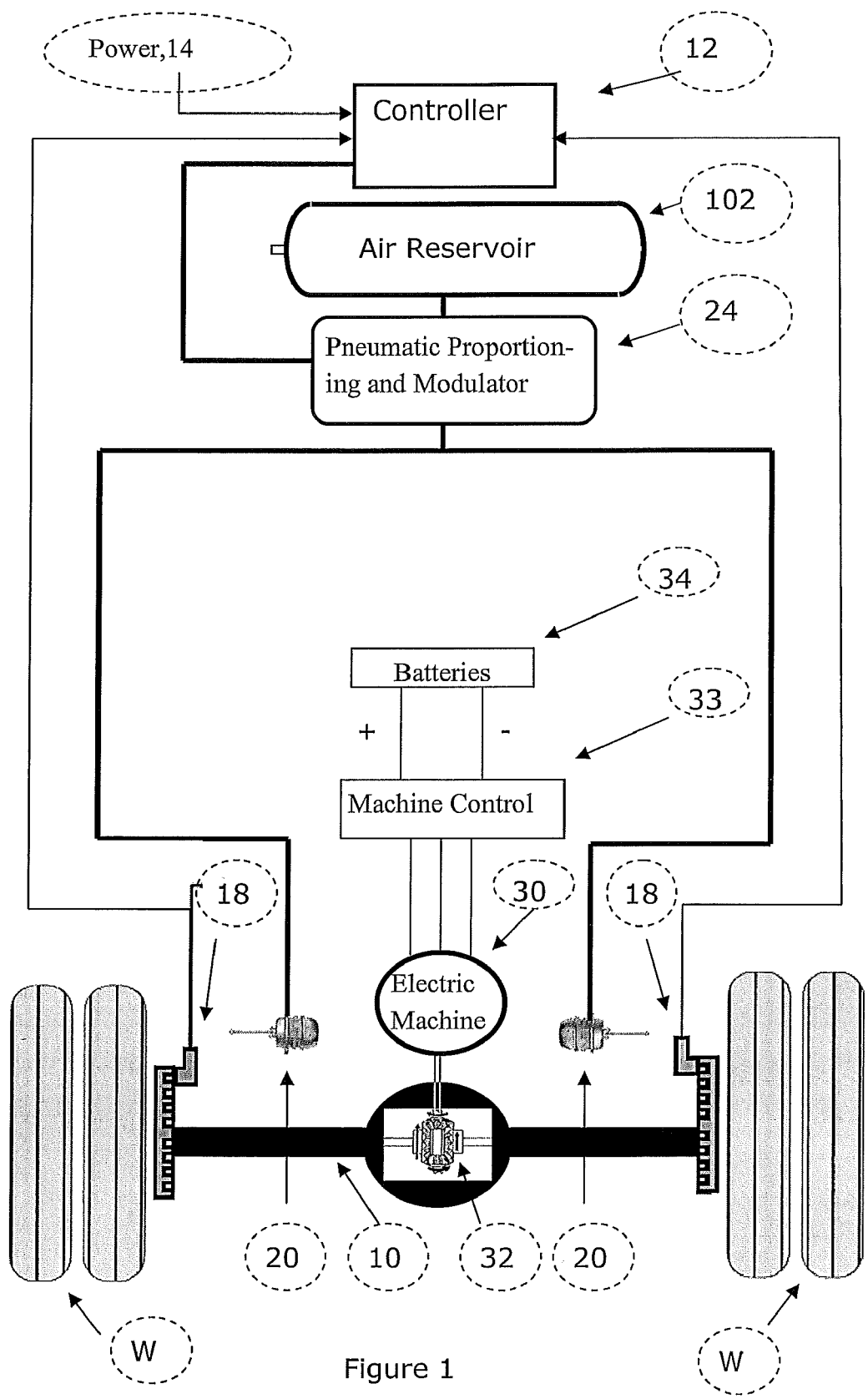
FIG. 1 is a schematic depiction of an electric hybrid braking system.

An exemplary hybrid braking system disclosed in detail hereafter is a secondary braking system that operates in conjunction with a foundation braking system, whether an air, hydraulic, electric, mechanical or electric braking system. The energy recovered during braking is returned to the axle wheels in a controlled manner while the vehicle is in motion and certain criteria are met. In this exemplary embodiment, control of the hybrid braking system comprises embedded software integrated into the vehicle's ABS controller or the EBS (Electronic Braking System) controller, but could be in a stand alone system. A stand alone system would negate brake blending, and a second set of wheel speed sensors would be needed. Using a specifically programmed ABS or EBS controller structure can result in seamless braking control, improved safety and elimination of redundant components. Brake wear can be significantly reduced depending on implementation and use.

The air brake system is designed in accordance with FMVSS 121 or similar standards that are applicable. During a braking event, the pneumatic pressure delivered to the brake chambers is controlled to allow the maximum available energy to be recovered and stored by the hybrid braking system. This is done through control of a pneumatic proportioning valve and a hydraulic metering valve. The controller would limit pneumatic pressure while allowing hydraulic flow into the accumulator. The combination of pneumatic braking force and hydraulic force would be proportional to the pneumatic signal from the treadle valve. Hence the blending of these two brakes does not exceed the driver command for braking. Energy from at least one axle on a drive or non-drive axle (tractor, towed vehicle and any combination of vehicles) is recovered and stored. This is applicable whether or not the axle is a braked axle or not (i.e., regardless of whether it is an axle having a conventional foundation brake).

Preferably, the energy is recovered from as many axles as possible, e.g., some or all braked drive axles and some or all braked non-drive axles, in order to maximize the amount of recovered energy. The stored energy is returned to the respective axles when there is no braking event and the vehicle has attained a speed above a predefined threshold speed or other criteria that assures that the returned energy is not sufficient, by itself, to accelerate or launch the vehicle, in this exemplary embodiment.

For instance, the stored energy can be returned in a controlled manner so the rate of energy return does not exceed the vehicle's energy losses attributed to aerodynamic drag and rolling resistance. The rate of energy transfer (measured in horsepower or watts) is not sufficient to launch or accelerate the vehicle. The stored energy can be applied until it is entirely dissipated. This exemplary hybrid braking system can recover more energy than a hybrid drive system (as described above) by virtue of the fact that it is applicable to more if not all axles and not just drive axles.

A hybrid braking system EHB of the electric type is depicted in FIG. 1. This configuration includes an electric machine 30 (e.g., a motor/generator or alternator) having a through-shaft (not shown) that connects the vehicle's drive shaft to the input pinion of the differential 32 of the axle 10, i.e., a so-called parallel hybrid drive configuration. The system of FIG. 1 is also applicable to non-drive axles on all vehicles whereby a differential axle would be installed in place of a traditional non-drive axle, to enable the electric machine to be connected thereto.

The control of the electric hybrid braking system is typically embedded in a controller 12, such as an ABS (anti-lock braking system) controller or a comparable EBS (electronic brake system) controller. The current exemplary embodiment will be described with the hybrid control being embedded in the ABS controller. The ABS controller 12 is an integral part of the air brake system and the electric hybrid system.

Electrical power 14 comes from the vehicle power source, or the brake light circuit, as is the case on many towed vehicles. Conventional wheel speed sensors 18, 18 and related hardware are part of the ABS system. The air brake system includes a c conventional brake chambers 20, and a pneumatic proportioning and modulator valve 24.

As indicated above, the electric hybrid braking system EHB includes the electric machine 30 which is directly coupled to the input of axle differential 32. The ABS controller 12 communicates the operation modes and energy requirements to a machine control 33 which is connected to the electric machine 30. Machine control 33 includes power electronics and a bidirectional DC/AC inverter that interfaces with storage batteries 34 (DC voltage) and the electric machine 30 (AC voltage) in this implementation. Energy is transferred between the batteries 34 and the axle differential 32 via the electric machine 30. During braking, the electric machine 30 serves as a generator. While in motion, the electric machine 30 serves as a motor, returning energy to the wheels.

The energy returned to the wheels is intentionally made insufficient to launch or propel the vehicle (which is already moving during the energy return). For instance the rolling resistance and aerodynamic drag per unit speed of the vehicle in question can be determined. That can be done empirically or by wind tunnel testing or actual road testing, or by computer-generated approximation or computer model of the vehicle's rolling resistance and/or drag, for example. That resistance/drag data would be stored in the controller 12 in data look-up tables or in algorithms, as the optimal and/or maximum amount of torque per unit speed to be returned to the vehicle's axle(s). Alternatively, the release of energy can be at a level that would not cause the momentum of the vehicle to change based on mass, which can be electronically measured by sensors in the vehicle. Yet another alternative is to actively measure parameters of operation (speed, inclination, load, operator acceleration by activating the gas pedal, etc.) to make determinations as to when and by how much energy can be released without risk of the energy release causing unexpected acceleration. Still other alternatives would include releasing the energy only when certain events are occurring, such as the vehicle is traveling at a steady pace for a threshold period that indicates highway driving, for example.

Figure 3:
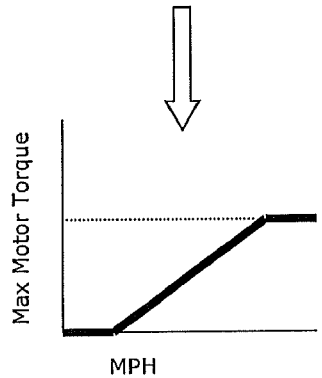
FIG. 3 is a flow chart of the HBS controller.

This control is depicted in the exemplar of FIG. 3, in which the curb weight (empty weight or un-laden weight) is used in the calculation. This ensures that the rate of energy transfer is always below the total drag since rolling resistance increases when the vehicle is loaded and aerodynamic drag increases with vehicle speed.

The hybrid brake system would be applied to any desired number of non-drive axles and drive axles of a vehicle, such as a tractor of a tractor-trailer unit. The realized benefits will be maximized proportionately to the number of axles that are utilized.

In practice, when the vehicle operator applies the brake (i.e., via pedal or hand trailer control valve), a brake light signal is communicated to controller 12. The ensuing braking action will be dependent upon the intensity at which the brake pedal is activated and the condition of the road surface (i.e., wet, dry, icy etc.). For most light brake applications, the electric machine 30 will be activated for operation as a generator, and the hybrid braking system will do the majority of the work, as compared to the work performed by the foundation brakes. As brake pedal force increases above a predetermined value, and/or as a hybrid brake system parametric limit is reached, the air and/or electric brake force of the hybrid brake system is proportionately increased in this exemplary embodiment. This process of brake blending ensures a smooth operation that is transparent to the driver. Under severe braking conditions which trigger an anti-lock event, only the foundation brake is used; the hybrid braking system is disabled in this embodiment by controller 12.

The energy storage devices, i.e., batteries (or hydraulic reservoir—discussed later) can be connected to the hybrid brake systems of all of the axles on a vehicle, thus serving as a common storage for the hybrid operation of that vehicle. Of course, more than one storage device can be used.

Regardless of whether the vehicle is only slowed by the braking, or is brought to a stop by the braking, none of the recovered energy is returned to the axle(s) until the vehicle is moving above a predetermined speed, e.g., 10 mph for example. In particular, the stored energy is converted to mechanical energy by operating the machine 30 as a motor, and that mechanical energy is delivered in a controlled manner to the axle only to compensate for drag, i.e., without serving to launch, propel or accelerate the vehicle, as explained above. That controlled blending of the recovered energy back into the drive system means that the machine 30 is prevented from operating in a high-energy mode in which it generates sufficient heat to warrant the need for a secondary cooling system, in this particular implementation.

Figure 2:
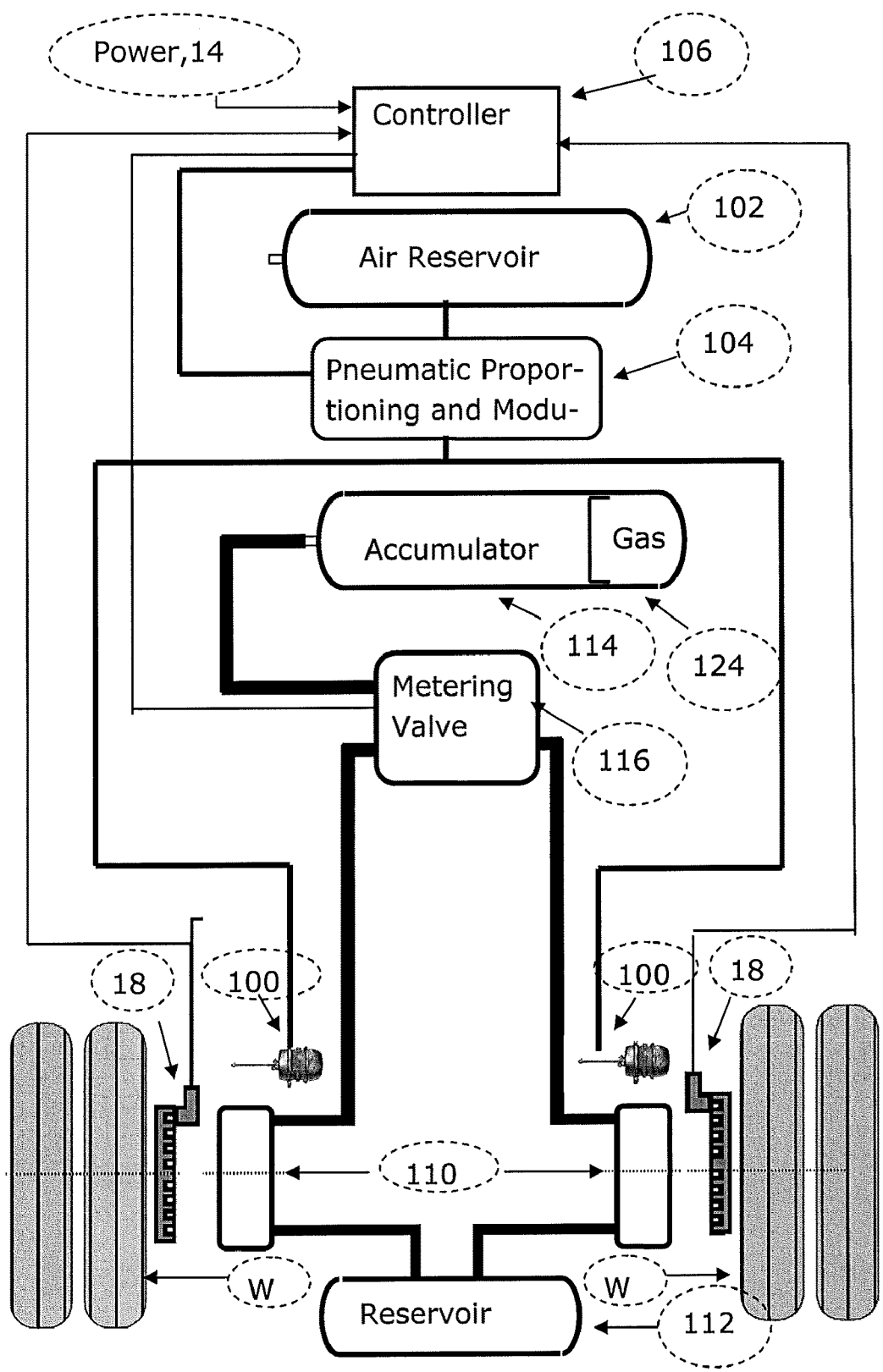
FIG. 2 is a schematic depiction of a hydraulic hybrid braking system.

A hybrid braking system HHB of the hydraulic type is depicted in FIG. 2. This configuration includes hydraulic machines 110 connected to the respective wheels of the axle(s) in question. This configuration is applicable to all axles whereby the hydraulic machines 110 (selectively operating as motors or pumps) are connected directly (mechanically) to the rotating members (wheels), but could be connected through an intermediary structure. The FIG. 2 system is thus applicable to drive and non-drive axles on all vehicles.

The control of the hydraulic hybrid braking system is typically embedded into a controller 106, such as the ABS (anti-lock braking system) controller or a comparable EBS (electronic brake system) controller. This preferred embodiment will be described with the hybrid control being embedded in the ABS controller. The ABS controller 106 is an integral part of the air brake system and the hybrid braking system. Electrical power 14 comes from the vehicle power source, or the brake light circuit as is the case on many towed vehicles. Conventional wheel speed sensors 18,18 and related hardware are part of the ABS system.

The primary mechanism employs a foundation brake system, such as a conventional air brake system designed in accordance with FMVSS 121 or similar standards. The secondary mechanism is a hybrid hydraulic system HHB that operates in parallel with the foundation brake mechanism. During a braking event, the primary and secondary braking systems are controlled in a manner as to allow the maximum available energy to be recovered and stored by the secondary system.

In one embodiment, energy is recovered and stored from at least one axle on a drive or non-drive axle (tractor, towed vehicle and any combination of vehicles). This can be applicable whether or not the axle is a braked axle or not (i.e., regardless of whether it is an axle having a conventional foundation brake). Preferably, the energy is recovered from as many axles as possible, e.g., some or all braked drive axles and some or all braked non-drive axles, in order to maximize the amount of recovered energy.

The air brake system comprises conventional air brake chambers 100 disposed at respective wheels, the chambers being connected to an air reservoir 102 through an optional pneumatic brake proportioning and modulator valve 104. The hybrid hydraulic braking HHB system comprises the hydraulic wheel machines (i.e., pump/motor) 110 directly coupled to respective wheels. The machines 110 are capable of acting as a pump or a motor as will be explained. Each hydraulic machine 110 is connected to a low pressure accumulator or reservoir 112 and to an energy storage device in the form of a high presser hydraulic accumulator 114, through a metering valve 116. HHB control is embedded in ABS controller 106 which controls the optional pneumatic proportioning valve and modulator valve 104 and the metering valve 116.

In practice, when the vehicle operator applies the brake (i.e., via pedal or hand trailer control valve), a brake light signal is communicated to the controller 106. The ensuing braking action will be dependent upon the intensity at which the brake pedal is activated and the condition of the road surface. For most light brake applications, the hybrid braking system does the majority of the work as compared to the amount of work performed by the air brake system. As brake pedal force increases and/or as the hybrid braking limit is reached, the foundation brake force is proportionately increased. This process of brake blending ensures smooth operation that is transparent to the driver. Under severe braking conditions which trigger an anti-lock event, only the foundation brake is used; the hybrid braking system is disabled by the ABS controller 106.

During a braking event, both the air brake system and the HHB hydraulic hybrid system are activated. The HHB is activated by controller 106. This enables metering valve 116 to convey fluid flow from each hydraulic machine to the accumulator 114. Thus, each hydraulic machine 110 operates as a pump driven by the wheel W to pump hydraulic fluid from the reservoir to the accumulator 114, which stores the hydraulic fluid under the pressure of a gas spring 124. The metering valve 116 is wide open to conduct as much hydraulic fluid as possible to the accumulator. Under severe braking conditions which trigger an anti-lock event, only the foundation brake is used; the hybrid braking system is disabled.

During a drive event, the stored energy (i.e., pressure exerted by compressed gas 124) in the high pressure accumulator is returned to the machines 110 when there is no braking event and the vehicle speed is above a predefined threshold speed, for example. This is done in a controlled manner so the rate of energy return does not exceed the vehicle's energy losses attributed to aerodynamic drag and rolling resistance, as explained earlier. The rate of energy transfer (measured in horsepower or watts) is supplemental power not capable to launch or accelerate the vehicle by itself. The stored energy is applied until it is entirely dissipated.

To return the energy, the ABS controller 106 enables the metering valve so that pressurized hydraulic fluid form the accumulator 114 is supplied via conduit to operate each machine 110 as a motor thus supplying power to the wheels. The hydraulic fluid is circulated back to the reservoir 112 from the motors 110. During this mode of operation only enough energy is supplied to the motors 110 to compensate for the drag acting on the vehicle, as explained earlier in connection with the hybrid system. Thus, the hydraulic hybrid system does not function to launch or propel the vehicle in this embodiment. It will be appreciated the accumulator 114 could be connected to all of the hydraulic hybrid machines 110 present on the vehicle to constitute a common energy storage means therefore in this embodiment. Likewise, the hybrid control would be common to all of the hybrid brake mechanisms. But, both the energy storage and control could be decentralized, e.g., be integral to a trailer independent of a tractor.

It will be understood that the disclosed hybrid braking system can be applicable to all braked axles on wheeled vehicles, such as tractors, trailers, dollies, etc. The total energy available for recovery is significantly higher than for hybrid drive systems by virtue of the fact that the energy comes from non-drive axles and not just drive axle(s). The total energy for regeneration is proportional to the weight distribution on each axle and the vehicle speed. If the hybrid braking system is applied to all axles in a combination vehicle, then some portion of all available kinetic energy is available for recovery and regeneration. For example, consider a tandem axle tractor towing a tandem axle trailer. If the hybrid braking system is placed on the tandem axles of both vehicles, then the total energy of recovery would be twice that of a hybrid drive system on just the tractor (assuming proportionate dynamic weight distribution). The recovery would be even higher if the hybrid braking system is applied to the steering axle.

In summary, the disclosed hybrid braking system offers numerous advantages over conventional hybrid drive systems. It can apply to all braked axles, whether drive or non-drive, not just to drive axles. The integration with the foundation brake system provides for a higher level of energy recovery (higher efficiency per axle). There will be reduced brake wear on all axles and thus lower maintenance cost in certain applications. A secondary cooling system is not needed in some embodiments, because the energy recovery machine is not used to launch or accelerate the vehicle, thus operation at a lower power level that generates less heat. Likewise, the energy storage device (battery pack or hydraulic accumulator) need be sized only for braking and not for vehicle launching or acceleration so it is smaller and lighter than would be required for hybrid drive systems.

It will be appreciated to those skilled in the art that additions, deletions, modifications and substitutions not specifically described, may be made without departing from the spirit and scope of the invention as defined in the appended claims. For instance, the choice of foundation brake system can include any suitable system, and the regenerative braking system can be electric, hydraulic, pneumatic or other type of system. The controller can be part of the ABS or EBS system, or standalone. The controller can operate for the entire vehicle, including combination vehicles, or be independent for each part.

As another example, referring to FIG. 1, an alternate configuration would be to substitute a hydraulic machine (pump/motor) in place of the electric machine 30 in FIG. 1. The batteries 34 and machine control 33 would be replaced with hydraulic components as described in connection with FIG. 2.

As a further example, and referring to FIG. 2, an alternate configuration would be to substitute electric machines (wheel motor/generators) in place of the hydraulic machines. The hydraulic components (reservoirs, accumulators and all hydraulic valves) would be replaced with electrical components as described in connection with FIG. 1. Other variations and modifications are within the scope of this disclosure.

What is claimed is:

1. A wheeled vehicle having at least one non-drive axle and a braking system comprising:
    a foundation brake mechanism operably connected to wheels on a non-drive axle;
    a hybrid brake mechanism including an energy recovery machine operably mounted to the non-drive axle and being selectively actuable for connection to the non-drive axle in a braking mode for being driven by the non-drive axle to generate energy, and in a drive mode for transferring energy to the non-drive axle;
    an energy storage device for storing energy received from the energy recovery machine when the energy recovery machine is being operated in its braking mode, and for returning stored energy to the energy recovery machine to operate the energy recovery machine in its drive mode; and
    a controller operably connected to the hybrid brake mechanism for actuating the energy recovery machine selectively in its braking mode to receive energy from the non-drive axle, and in its drive mode for transferring energy to the non-drive axle only when the vehicle is in motion.

2. The wheeled vehicle according to claim 1, wherein the controller is operable for regulating the transfer of energy from the energy storage device to the energy recovery machine wherein the energy recovery machine returns less energy to the non-drive axle than would be necessary to propel the vehicle.

3. The wheeled vehicle according to claim 1, wherein the controller is operable for regulating the transfer of energy from the energy storage device to the energy recovery machine so that driving of the non-drive axle by the energy recovery machine is sufficient for counteracting no more than the rolling resistance and the aerodynamic drag acting on the vehicle.

4. The wheeled vehicle according to claim 1, wherein the vehicle includes a plurality of non-drive axles and a plurality of said hybrid brake mechanisms operably mounted to respective non-drive axles, wherein the energy storage device is common to the energy recovery machines of a plurality of the hybrid brake mechanisms.

5. The wheeled vehicle according to claim 1, wherein each energy recovery machine comprises an electric machine operable as a generator in the braking mode and as a motor in the drive mode, and the storage device comprises a battery.

6. The wheeled vehicle according to claim 1, wherein the energy recovery machine comprises a hydraulic machine operable as a pump in the braking mode and as a motor in the drive mode, and the energy storage device comprises a hydraulic accumulator.

7. The wheeled vehicle according to claim 1, wherein the vehicle includes a drive axle and another hybrid brake mechanism operably mounted thereto, wherein the other hybrid brake mechanism comprises another energy recovery machine selectively actuable for connection to the drive axle in a braking mode for being driven by the drive axle to generate energy, and in a drive mode for transferring energy to the drive axle; the energy storage device connected for storing the energy received from the other energy recovery machine when operated in its braking mode, and for returning stored energy to the other energy recovery machine when operated in its drive mode; the controller operable connected to the other energy recovery machine for actuating the other energy recovery machine selectively in its braking mode to receive energy from the drive axle, and in its drive mode for transferring energy to the drive axle only when the vehicle is in motion.

8. The wheeled vehicle according to claim 1, wherein the vehicle comprises a tractor of a tractor-trailer unit.

9. The wheeled vehicle according to claim 1, wherein the vehicle comprises a towed trailer.

10. A method of braking a wheeled vehicle having at least one non-drive axle, comprising the steps of:
    A. connecting the non-drive axle to an energy recovery machine, wherein rotation of the non-drive axle operates the energy recovery machine in a braking mode for generating energy;
    B. selectively supplementing braking force of the energy recovery machine with an air brake force;
    C. delivering the energy generated by the energy recovery machine in step A to an energy storage device;
    D. subsequent to Step C, returning energy stored in step A to the energy recovery machine for causing the energy recovery machine to drive the non-drive axle only when the vehicle is in motion.

11. The method according to claim 10, wherein step D is preformed without propelling the vehicle with returned energy.

12. The method according to claim 11, further including the step of determining the rolling resistance and the aerodynamic drag acting on the vehicle, wherein step D is performed to counteract no more than the rolling resistance and the aerodynamic drag.

13. The method according to claim 10, wherein step A comprises connecting the non-drive axle to an electric energy recovery machine which operates as an electric generator in its braking mode, and step D comprises operating the electric energy recovery machine as a motor in its drive mode.

14. The method according to claim 10, wherein step A comprises connecting the non-drive axle to a hydraulic energy recovery machine which operates as a pump in the braking mode for pumping hydraulic fluid from a reservoir to an energy storage device comprising a hydraulic accumulator, and step D comprises operating the hydraulic energy recovery machine as a motor in the drive mode.

* * * * *